March 28, 1961 R. F. HAUTLY 2,976,732
MEANS FOR RECORDING FORCES TO WHICH
SHIPPED ARTICLES ARE SUBJECTED
Filed Sept. 30, 1958

INVENTOR.
RUDOLPH F. HAUTLY
BY Frank Groom Wirtz
ATTORNEY

United States Patent Office 2,976,732
Patented Mar. 28, 1961

2,976,732

MEANS FOR RECORDING FORCES TO WHICH SHIPPED ARTICLES ARE SUBJECTED

Rudolph F. Hautly, 630 Kirkshire, Kirkwood, Mo.

Filed Sept. 30, 1958, Ser. No. 764,346

3 Claims. (Cl. 73—492)

This invention relates primarily to a simplified recording accelerometer which is particularly adapted to being packed with articles of a fragile nature in order to measure and record the maximum accelerations in any direction, to which those articles are subjected during transit from the manufacturer to the ultimate purchaser.

One of the principal advantages of this invention lies in the extremely small character of the recording accelerometer, so that it can be included with an article in a package of a minimum size.

Another advantage of this invention lies in the foolproof simplicity of the steps of measuring, recording and preserving the records of the maximum accelerations, and hence the maximum forces to which the article in transit has been subjected.

A further advantage of the invention lies in the ease which the maximum forces to which the article has been subjected can be read out for simplified interpretation.

A still further advantage of the invention lies in the inexpensive character of the measuring and indicating and recording device.

With these and other objects in view, an embodiment of the invention is shown in the accompanying drawings, and this embodiment will be hereinafter more fully described with reference thereto, and finally, the invention specifically delineated in the claims.

Figure 1:
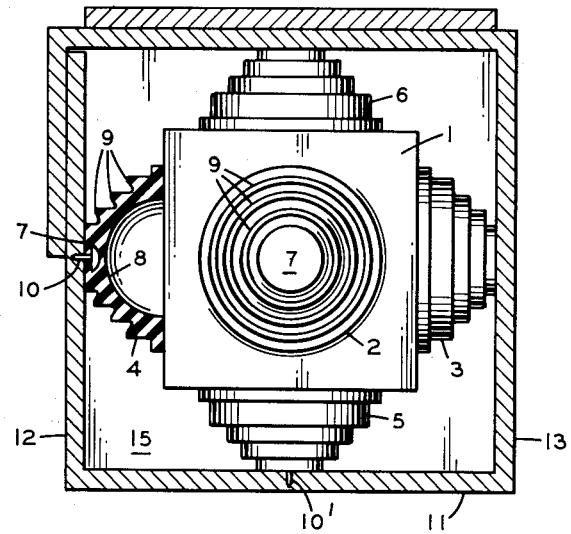
Figure 1 is an elevational view, partly in section, of the printing accelerometer together with the box in which it is mounted for recording.

In Figure 1, numeral 1 is applied to an inertial body, in the shape of a block or cube of wood, metal, plastic or rubber. Cemented or otherwise affixed to the block on its six mutually perpendicular faces are six rubber or plastic printing indicators of which only five appear in the drawing of Figure 1. They are numbered 2, 3, 4, 5 and 6. It will be noted that there are two printing indicators located facing away from each other at opposite ends of the three mutually perpendicular axes along which vector forces are ordinarily measured.

Each printing indicator is provided with a relatively flat central rest face 7 which is disposed against an inner surface of the surrounding cardboard box. Each printing indicator is provided with a central cavity 8, depicted on printing indicator 4 at the left of Figure 1. Also each printing indicator is provided on its outer surface with a series of concentric ridges or rings 9, 9, 9.

Two only of the printing indicators are provided with an embedded metal centering pin, 10. These are indicator 4, provided with 10, and indicator 5 provided with 10'. These two metal centering pins are always located on printing indicators disposed at right angles to each other. Their purpose is to prevent the assembly of inertial block and printing indicators from tilting or slipping to a skewed position in the cardboard box.

Figure 2:
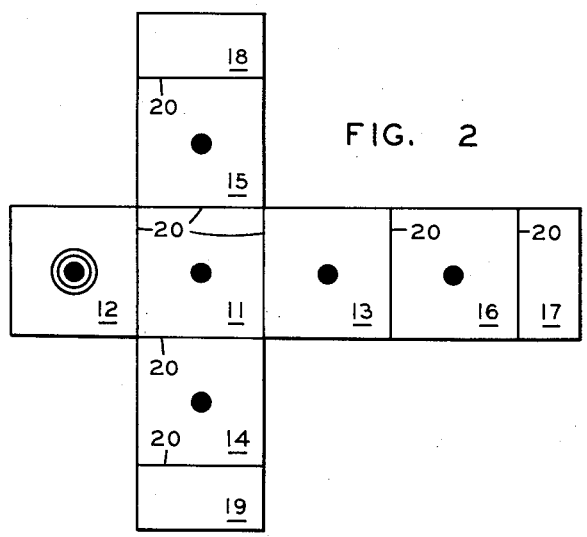
Figure 2 is a plan view of the box, showing six of the printed records upon the six sides in contact with the printing accelerometer.

The cardboard box is shown in Figure 2 as it is spread out before and after use, when it has become a record. The box is provided with a bottom 11, four sides perpendicular thereto, 12, 13, 14 and 15. Attached to side 13 is the top 16, and securing flap 17. Attached to side 15 is securing flap 18; attached to side 14 is securing flap 19.

The box is formed by bending the cardboard which is otherwise extremely rigid, along the preformed fold lines 20, 20.

Precedent to inserting the printing indicator and block assembly into the box, the operator in turn presses each printing indicator against a stamp pad which contains ink. I prefer to use an ink which contains an identifiable trace element or elements so that the record will be able to avoid counterfeiting and so that its authenticity can be verified by spectroscopic identification of the components. Also I prefer to use an ink such as is common in letterpress or offset printing, which has the characteristic that it will not dry appreciably in air on the printing indicator of rubber or plastic, but which will however be absorbed readily into cardboard or similar surfaces and dry thereon.

After the printing indicators, six in number, have been thoroughly inked, the box is assembled around the block assembly. In order to accomplish this, I set rest face 7 of indicator 5, with its centrally disposed centering pin 10' upon the center of the bottom 11 of the box. Next I raise up side 12, and pierce it with centering pin 10 of indicator 4. Then I successively perform the following steps: I raise side 13 into position as shown in Figure 1, bend down top 16 and secure the securing flap 17 by glue or tape to side 12. Sides 14 and 15 are then raised into position and their securing flaps 18 and 19 are bent down on the top 16 and glued or taped also in place.

In this position the rest face of each printing indicator will lie in close flat contact with an adjacent cardboard surface.

The box and its printing accelerometer contents are then affixed securely inside an article which is to be shipped, such as a refrigerator, television set, or any delicate, fragile device.

The durometer value of the rubber of the printing indicators as well as the size of the internal cavity of the indicators, which may be entirely omitted in certain cases, is chosen to be of a value such that the following conditions will apply.

Let us assume that a delicate electronic assembly such as an oscilloscope is to be shipped. The manufacturer has established by test that the particular model must not be subjected to accelerations greater than 2 times the force of gravity. This can be established by standardizing an accelerometer and calibrating it by known methods and then using it to test the oscilloscope model. The printing accelerometer which I have described can then be securely affixed to the inside of the oscilloscope.

Figure 3:
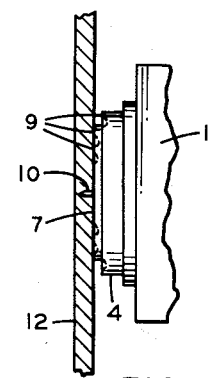
Figure 3 is a fragmentary view of the printing indicator at the left of Figure 1, when subjected to an acceleration sufficient to compress the indicator.

The durometer value of the rubber of the indicators and the size of the cavity of the indicators can be chosen so that under an acceleration of 2 times the force of gravity, the indicator will assume the position shown in Figure 3, that is, the rest face 7 and two of the concentric ridges 9, 9 will contact the cardboard side 12. When they contact the side 12 they will print by transfer the ink they carry to exhibit the record shown on side 12 of Figure 2.

Figure 4:
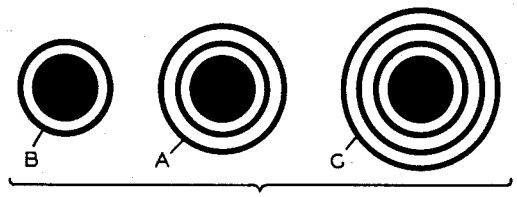
Figure 4 is a print of three successively larger acceleration records.

Also this value will be recognized in larger detail as the central print A of Figure 4. An acceleration of less than 2 times gravity on the same printing indicator, and in the same direction will appear as the left-hand print B of Figure 4. Similarly an acceleration of greater than twice gravity will appear as the right-hand print C of Figure 4.

Extremely slight variations in durometer values and sizes of the central cavity of the indicator can produce varieties of recording devices having sensitivity ranges in the tenths of the force of gravity, as well as far greater values, as when a solid, hard rubber indicator is used.

According to my method of usage, I contemplate that the manufacturer print inside the box or on its outside surface, the maximum number of rings which can be printed by the printing accelerometer during shipping to insure a safe transit. The consignee will sign the record on the inside of the box, whereon will be printed a form stating that he has witnessed that a certain stated number of rings have been printed. He will fill in the number of rings by his own count.

The transfer agent or party delivering the delicate apparatus will take the box with him. It will be flattened out and will be preserved as evidence for a sufficient time to make it a useful record in the case of contested claims for damage in transit. Simple calculations for the particular indicator will show the actual forces sustained.

It will be noted that the maximum forces to which the device is subject along each of the three mutually perpendicular axes will be printed by my device. It is important that the device be not cushioned inside the outer package in which the article is shipped but should be rigidly mounted or affixed to the inside or outside of the article itself.

While the invention has been described with particular reference to specific embodiments, it is to be understood that it is not to be limited thereto but is to be construed broadly and restricted solely by the scope of the appended claims.

I claim:

1. In an instrument for printing with ink a record of the forces to which the instrument is subjected, an inertial block of relatively large mass in the form of a cube, a plurality of compressible inked printing indicators provided with concentric ridges, an indicator mounted at the center of each face of said cube, and a box in the form of a hollow cube provided with inner surfaces, the ridges of said printing indicators being supported by and spaced from the inner surfaces of the box and ink on the ridges immediately adjacent the inner surfaces of the box, so that the ridges, according to the degree of impact, compress telescopically to mark the inner surfaces of the box.

2. In an instrument for printing with ink a record of the forces to which the instrument is subjected, an inertial block of relatively large mass in the form of a cube, a plurality of compressible inked printing indicators made of rubber, provided with a central cavity and mounted on each face of said cube, a pair of centering pins fixed in the ends of two of said printing indicators which are disposed at right angles to each other, a set of concentric ridges on each printing indicator, and a box in the form of a hollow cube having six inner surfaces, the ridges on said printing indicators supported by and spaced from said inner surfaces, said centering pins embedded in two of said inner surfaces and fixed to said box, and ink on the ridges adjacent the inner surfaces of the box so that the ridges, according to the degree of impact, compress telescopically, to mark the inner surfaces of the box with ink.

3. In an instrument for printing with ink a record of the forces to which the instrument is subjected, an inertial block of relatively large mass, six compressible inked printing indicators, said six indicators comprised of three sets of two each, facing away from each other and each set of two mounted upon one of three mutually perpendicular axes upon said block, each indicator provided with a central cavity, a rest face and a set of concentric ridges, a hollow box provided with six inner surfaces, said ridges supported by and spaced from said inner surfaces by said rest faces, and said surfaces adapted to receive ink from the ridges of said printing indicators, and ink on the ridges adjacent the inner surfaces of the box so that the ridges, according to the degree of impact, compress telescopically to mark the inner surfaces of the box with ink.

References Cited in the file of this patent

UNITED STATES PATENTS

| | | |
|---|---|---|
| 1,773,113 | Morton | Aug. 19, 1930 |
| 2,338,732 | Nosker | Jan. 11, 1944 |
| 2,441,162 | McPherson | May 11, 1948 |
| 2,454,793 | Grogan et al. | Nov. 30, 1948 |
| 2,502,536 | Roper | Apr. 4, 1950 |
| 2,601,440 | Kerrigan | June 24, 1952 |

FOREIGN PATENTS

| | | |
|---|---|---|
| 1,145,559 | France | May 6, 1957 |